(12) United States Patent
Zanolin et al.

(10) Patent No.: US 7,044,155 B2
(45) Date of Patent: May 16, 2006

(54) JOINT-TYPE COAXIAL CONNECTION

(75) Inventors: Sergio Zanolin, Polcenigo (IT); Giuseppe Fin, Meolo (IT)

(73) Assignee: DE'Longhi SpA, Treviso (IT)

( * ) Notice: Subject to any disclaimer, the term of this patent is extended or adjusted under 35 U.S.C. 154(b) by 90 days.

(21) Appl. No.: 10/911,920

(22) Filed: Aug. 5, 2004

(65) Prior Publication Data

US 2005/0028877 A1     Feb. 10, 2005

(30) Foreign Application Priority Data

Aug. 8, 2003    (IT) ................. UD2003A0167

(51) Int. Cl.
  *F16K 49/00*    (2006.01)
  *F16L 37/28*    (2006.01)
(52) U.S. Cl. ............... 137/340; 137/594; 137/614.04; 285/134
(58) Field of Classification Search ........... 137/594, 137/340, 614.04; 285/134
See application file for complete search history.

(56) References Cited

U.S. PATENT DOCUMENTS

| | | | |
|---|---|---|---|
| 3,211,178 A | | 10/1965 | Kiszko |
| 4,285,364 A | * | 8/1981 | Hawker ............ 137/614.03 |
| 4,763,683 A | * | 8/1988 | Carmack ............ 137/68.15 |
| 4,889,149 A | | 12/1989 | Weaver et al. |
| 5,014,743 A | | 5/1991 | Makishima |
| 5,297,574 A | * | 3/1994 | Healy ............... 137/68.15 |
| 5,570,719 A | * | 11/1996 | Richards et al. ........ 137/614.04 |
| 5,778,971 A | * | 7/1998 | Szam ............... 165/90 |
| 6,164,316 A | * | 12/2000 | Betti ............... 137/338 |
| 6,308,727 B1 | * | 10/2001 | Healy ............... 137/68.15 |

FOREIGN PATENT DOCUMENTS

GB        1139145 A    1/1969

\* cited by examiner

*Primary Examiner*—A. Michael Chambers
(74) *Attorney, Agent, or Firm*—Akin Gump Strauss Hauer & Feld LLP

(57) ABSTRACT

Joint-type coaxial connection (10) to connect/disconnect to/from each other two elements (A, B) defining coaxial tubular pipes inside which a respective fluid flows. The connection (10) defines two respective coaxial paths for the passage of the fluid, one internal and one external, able to be selectively opened/closed substantially simultaneously so as to connect pairs (11a, 11b; 12a, 12b) of tubular pipes, respectively inner and outer. In the connection step the two elements (A, B), located coaxial and with the front faces in contact, have a reciprocal approaching travel with the sealing means (44, 45, 46, 47, 48, 49, 50, 51, 52) which close every passage between the inner pipe and the outer pipe, and between the outer pipe and the part of the joint outside the outer pipe, before achieving the reciprocal fluid-dynamic continuity of the two coaxial pipes of the connection.

16 Claims, 3 Drawing Sheets

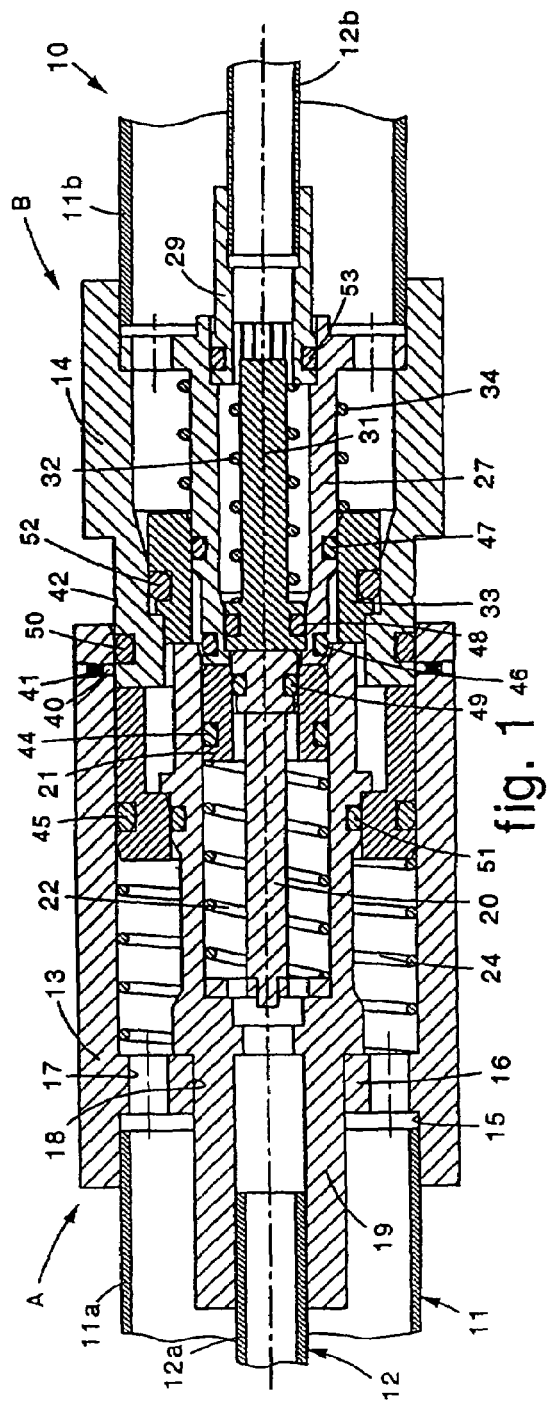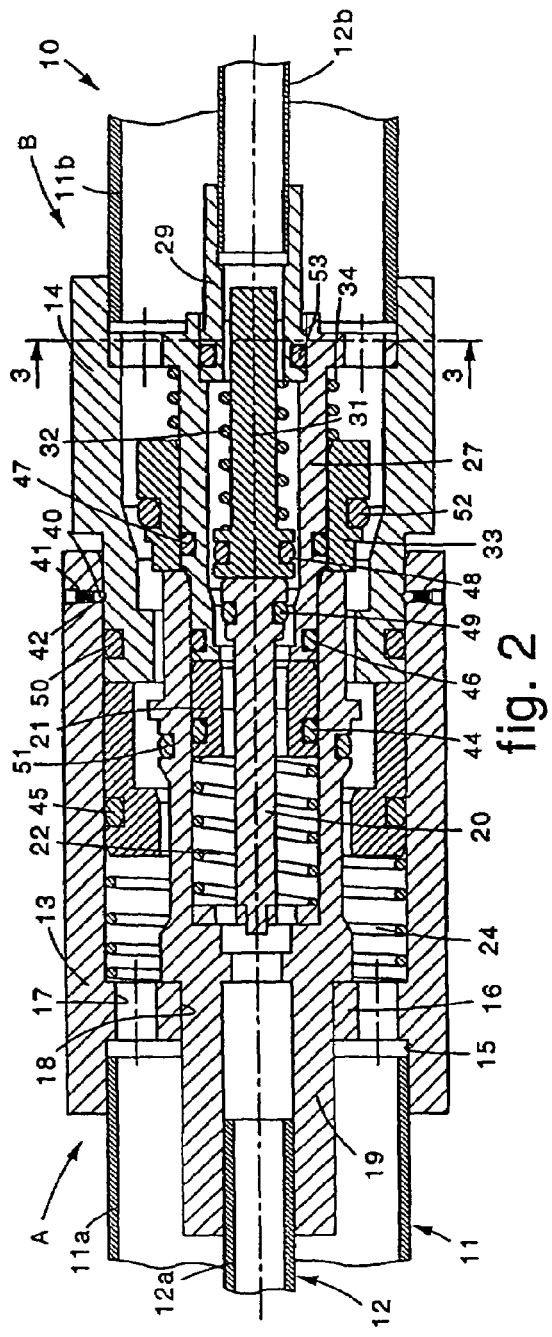

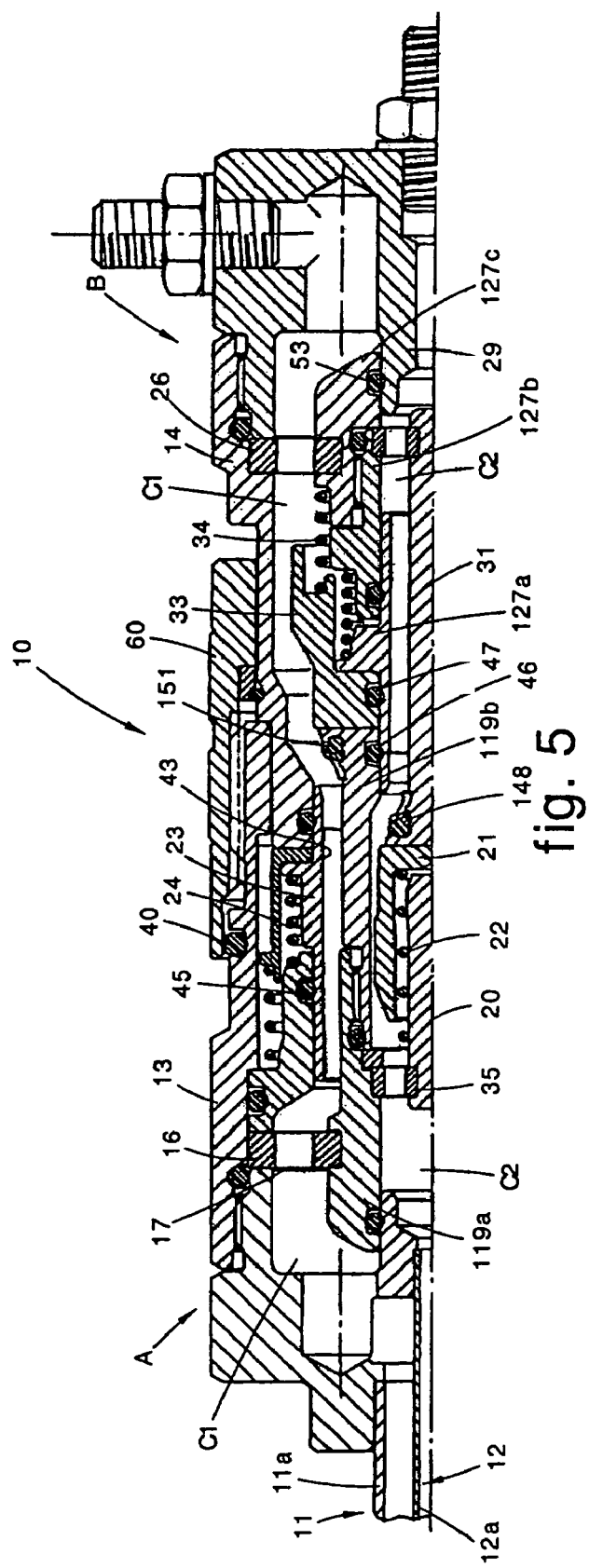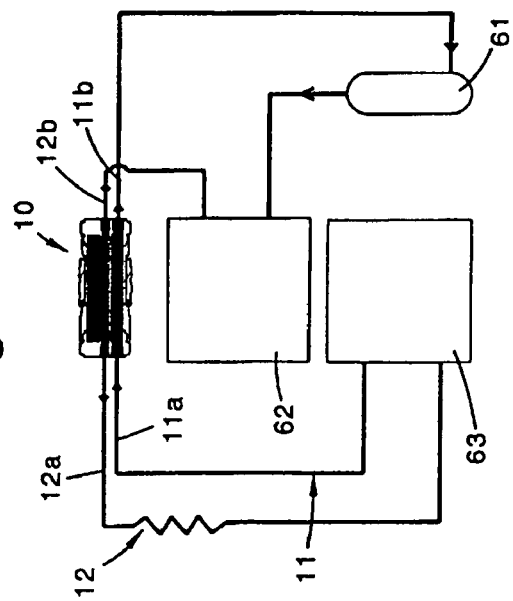

JOINT-TYPE COAXIAL CONNECTION

FIELD OF THE INVENTION

The present invention concerns a joint-type coaxial connection able to connect/disconnect, substantially simultaneously, two pairs of tubular pipes inside which a fluid flows.

The fluid is a gas, advantageously a cooling gas, but it can also be a liquid, or in a first pair of pipes the fluid is a gas and in a second pair of pipes the fluid is a liquid.

The invention is applicable in all cases where two pairs of pipes must be able to be reciprocally separated and reconnected, substantially simultaneously and with a single action to connect/disconnect them, keeping both the circuits under pressure which, on one side and the other of the joint, reconnect to the two elements that make up the joint-type coaxial connection.

BACKGROUND OF THE INVENTION

Connections are known, used to connect simultaneously and in dis-connectable manner two pairs of connections. Known connections have two adjacent rapid joints assisted by an auxiliary device that facilitates the connection and disconnection thereof.

Such known devices have problems, however, in their handling, they are big and heavy and, not last, they do not ensure a correct and simultaneous connection/disconnection, possibly with a single movement to attach/detach them.

If, for example, the pipes to be connected/disconnected are part of a cooling system, for example for cooling an environment, it is quite clear that the above shortcomings not only make the whole thing difficult to handle, but also create problems with regard to gas leaks, and hence the cooling plant does not function and there are potential dangers for the users.

In the same way, if the pipes transport water, oil or other, the leak over time causes anomalous behavior in the system.

U.S. Pat. No. 5,014,743 describes a rapid attachment, double tube joint, comprising a male element and a female element able to be selectively coupled, usable in heat conditioning plants with air circulation, particularly to prevent that outside air enters into the circuit once the joint is inter-connected.

To be more exact, when the two components of the joint are inserted one into the other, the joint is in the open condition, and between the inlet and outlet of the joint two annular pipes are formed, an inner pipe and an outer pipe, coaxial with respect to each other and with the axis of the joint, separated in seal-tight manner from each other and each one suitable to have a fluid flow through.

A first disadvantage of this joint is the considerable constructional complexity and the large number of components. A second disadvantage derives from the fact that the seals of the annular pipes, both between them and with respect to the outside, are made in such a manner that they do not guarantee a good seal over time. The presence of this type of seal causes problems of cleaning, complexity and accuracy in working, duration of the packings, wear and maintenance, and also problems with the management of the spare parts in the stores.

Furthermore, this type of sealing element intervenes only at the last moment, which imposes great working precision, and does not supply an adequate sealing during transition before the two pairs of pipes are made to communicate.

Another disadvantage is that one element extends, in the coupled position, very much inside the second element, and this entails a great travel with problems concerning the sealing and maintenance of the necessary values of standard pressure in the fluids.

The Applicant has devised, tested and embodied the present invention to overcome the shortcomings stated above.

SUMMARY OF THE INVENTION

The present invention is set forth and characterized in the main claim, while the dependent claims describe other innovative characteristics of the invention.

According to the invention, a joint-type connection is achieved, of the so-called rapid type, wherein the two fluids passing in the respective two pairs of pipes flow coaxial with respect to each other, respectively one external and one internal, substantially coaxial to the axis of the joint.

The two fluids can circulate in the same direction or in opposite directions, which is substantially irrelevant to the correct functioning of the joint-type connection.

According to one embodiment of the invention, the joint advantageously has reciprocal clamping means for the two connecting components, the components being a first and a second element. These first and second element can exchange positions.

According to another characteristic, the pipes are opened when the respective external bodies of the two components of the joint are already cooperating axially and at least one circumferential sealing means is operating in relation to every pipe.

According to another characteristic of the invention, in its operative position, the joint also functions as a heat exchanger between one fluid and another as they pass through.

According to a variant, in a cooling plant, the joint according to the invention is located in cooperation with the delivery pipes from an evaporator to a compressor and with the delivery pipes from a condenser to a capillary or to an expansion valve.

According to the invention, the joint-type connection has two external bodies, hollow inside, a female body and a male body, able to be coupled together axially by means of a circumferential mechanical sealing coupling, and able to slide one with respect to the other for a short travel. In the various embodiments, the coupling of the bodies can be achieved in snap-in manner, bayonet-wise, screwed or by simple interference determined or assisted by the circumferential hydraulic sealing means.

According to the invention, a first element has two concentric cylindrical bodies and a fixed piston-type contrasting element, reciprocally fixed and coaxial, assisted, in the respective circumferential compartments, by two circular rings, movable and elastically contrasted, also coaxial with the fixed components. The second element has two concentric cylindrical bodies reciprocally fixed and coaxial, able to cooperate with the respective movable circular rings of the first element, and a circular ring and a piston element, both elastically movable contrasted and coaxial with said two reciprocally fixed cylindrical bodies. Said circular ring and said piston element are able to cooperate respectively with the inner cylindrical body and with the fixed piston-type contrasting element of the first element.

According to a variant, abutment means including elastic means define the positions of reciprocal end-of-travel between the first and the second element.

The outer diameter of the external bodies defines substantially the bulk in width of the connection and, according to the invention, assumes a reduced value of between 33 and 45 mm, advantageously around 38÷40 mm.

Both the first and the second element have cylindrical external bodies, respectively male and female. The first element, in the case given as an example here, functioning as a female element, has a first external cylindrical body, a second cylindrical body, inside and coaxial with the first, but annularly detached therefrom, and a rod-type positioning body, inside the second body but annularly detached therefrom. All three of these components are reciprocally fixed and coaxial.

Between the first external cylindrical body and the second cylindrical body, in the respective annular space, there is a second movable crown consisting of an elastically contrasted circular ring.

Between the second cylindrical body and the positioning body, in the respective annular space, there is a first movable crown consisting of a circular ring.

Since all the elements indicated above have inner and outer surfaces that are cylindrical, the hydraulic or pneumatic seal is always achieved through axial sliding by means of O-rings, or by means of sealing means that work by axial sliding on cylindrical surfaces.

The second element, which also has elements with cylindrical surfaces, and which therefore admits sealing means that work on cylindrical surfaces, has means mating with those of the first element, so that the fixed components of the first element cooperate with axially movable components, elastically contrasted, of the second element. Vice versa, the fixed components of the second element cooperate with axially movable components, elastically contrasted, of the first element.

As we said, the first and second element can exchange functions, so that the fixed or movable elements can be made alternatively either in the male or in the female element, or in both, since on each occasion there is a movable element present in an element cooperating with a fixed element present in the other element.

In cooperation with each of said positioning bodies, the joint-type connection has movable opening/closing means, for example with a ring, ring-nut or piston, associated with elastic means which keep them in an inactive position wherein they close the transit apertures of the fluid inside the joint-type connection in order to interrupt the flow of fluids. This interruption, with the joint according to the invention, keeps the respective pressures in the two segments of the circuit unchanged, so that there is no loss of pressure.

The movable opening/closing means are able to be driven, overcoming the force of the respective elastic means, when the male body and the female body are made to slide coaxially one with respect to the other, so as to open the relative transit passages for the fluid, after the sealing means have been activated, thus putting into communication the respective pair of pipes. As a result of this conformation, there is no loss of pressure in either of the two plus two segments of the circuits which re-connect to the joint during the insertion/activation step. Once the drive command has terminated, the elastic means automatically return said movable opening/closing means to their position in order to restore the interruption of the passage of fluid and disconnect the respective pair of pipes. In this condition, the male and female elements can be separated from each other, in any case ensuring continuity of the hydraulic seal due to the presence of the circumferential sealing means, which operate through axial sliding and are arranged along the relative pipes, and preventing losses of pressure in the circuits.

Said circumferential sealing means are arranged substantially on all the cylindrical elements of the male and female body which, once assembled, make up the joint.

A possible frontal or semi-frontal sealing means may be provided to give a greater and better guarantee of the seal during working.

When the joint is open, these elements perform their typical sealing function in order to prevent every possible leakage of liquid or gas from the respective bodies.

When the joint is open, in addition to the sealing function, these elements facilitate a correct axial sliding of the reciprocally movable parts, such as valves, pistons or positioning elements, reducing the sliding friction and preventing localized wear and damage.

According to the invention, once the two components, that is, the male and female element, are located coaxial and in reciprocal contact, that is, in a condition to be able to connect with each other so as to give hydraulic continuity to the coaxial pipes, they have to make a reciprocal travel towards each other before the coaxial pipes find respective continuity.

This reciprocal travel occurs with the sealing means all in action, so that there is no danger of leakages of gas or of fluids, until the pipes form a fluid-dynamic continuity.

According to a variant, the movable opening/closing means can be driven by remote, by means of drive means with a pneumatic, hydraulic or electric command.

By using two pairs of tubular pipes arranged coaxial one to the other, it is possible on the one hand to reduce the overall bulk of the connection and to simplify the attachment/detachment procedures; on the other hand, it facilitates the heat exchange between the two passing fluids, which achieves, for example, savings in possible cooling processes to be carried out downstream of the connection.

BRIEF DESCRIPTION OF THE DRAWINGS

These and other characteristics of the present invention will become clear from the following description of a preferential form of embodiment, given as a non-restrictive example, with reference to the attached figures wherein:

FIG. 1 is a longitudinal section of a joint-type coaxial connection, or joint, according to the invention, in the closed position;

FIG. 2 shows the connection in FIG. 1 in the open position;

FIG. 5 shows a variant of the joint-type connection according to the invention in a longitudinal half-section;

FIG. 6 is a block diagram of a preferential assembly of the joint-type coaxial connection in a cooling plant.

DESCRIPTION OF A PREFERENTIAL EMBODIMENT OF THE INVENTION

Figure 3:
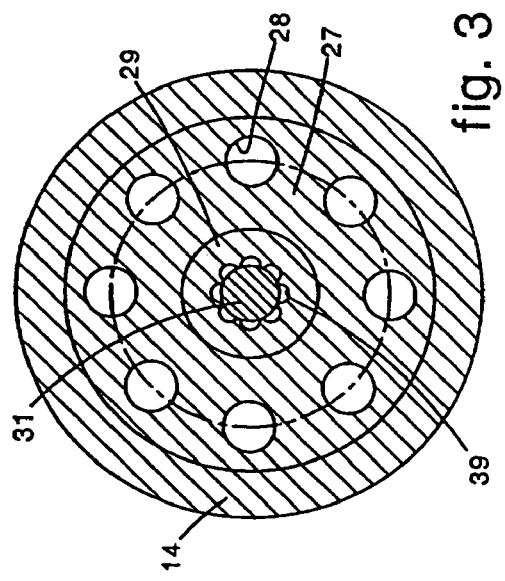
FIG. 3 is the section from 3 to 3 of FIG. 2.

With reference to the attached figures, a joint-type coaxial connection 10 according to the invention is shown, suitable particularly but not exclusively for use in cooling plants. In the attached figures, as an example, the first element is indicated in its entirety by the letter "A", and is the female element, while the second element is indicated in its entirety by the letter "B", and is the male element.

The joint-type coaxial connection 10 is of the type for cooling plants with an expansion capillary where cooling fluid circulates. The joint 10 cooperates with a pressurized tube 11 to transport the liquid, which passes through the connection 10 in its outermost annular pipe (indicated by C1 in FIGS. 4 and 5), and with a capillary 12 to control the expansion of the gas, which passes through the connection 10 in its innermost annular pipe (indicated by C2 in FIGS. 4 and 5). The connection 10 serves to connect two segments of the tube 11, respectively left 11a and right 11b in the figures, and two segments of the capillary 12, respectively left 12a and right 12b.

Thanks to its geometric constitution, the connection 10 also functions as a heat exchanger.

It should be noted that the geometric shape of the terminal parts, where the tubes 11 (11a, 11b) and 12 (12a, 12b) are shown as examples, can be varied and the tubes 11 and 12, in one or both the elements A and/or B, may not be coaxial at the moment of connection with the joint-type connection 10.

The connection 10 comprises a first hollow external body 13, in this case female, and a second hollow external body 14, in this case male, both cylindrical; the male body 14 is able to be coupled and to slide axially for a short travel with respect to the female external body 13.

The first external body 13, in the case shown here, includes a seating 15 open towards the outside in order to house and retain one end of the segment 11a of the tube 11; the seating 15 is delimited at the front by a flange-type ring 16 including peripheral holes for the transit of liquid 17 and defining a central hole 18 into which a hollow and elongated positioning body 19 is inserted and clamped. The hollow positioning body 19, solid with the first external body 13, defines axially a seating open towards the outside in order to house and retain the segment 12a of the capillary 12.

On the outside (see FIG. 4 in particular), the positioning body 19 has a sliding circumferential sealing element 51, suitable to cooperate, when the two elements A and B are not coupled, that is, when the connection 10 is in the closed condition, with a mating cylindrical surface 43 of the second movable crown 23, in order to ensure the hydraulic closure of the outer annular pipe C1.

Inside the positioning body 19, and in a position facing towards the second external male body 14, there is a fixed piston 20 which functions as a positioning and sliding element for a first crown 21, movable axially against the action of first elastic means 22. The fixed piston 20 is held in position by a washer 35 including peripheral holes 36 through which the fluid passes.

On the outside of the fixed piston 20 a circumferential sealing element 49 is assembled, suitable to cooperate, when the two elements A and B are not coupled, with a mating cylindrical surface 55 of the first movable crown 21, for a correct circumferential seal.

Moreover, on the first crown 21 a circumferential sealing element 44 is assembled, for example an O-ring, which cooperates continuously, and in an axial direction, with the inner cylindrical surface of the positioning body 19.

On the outside of the hollow positioning body 19 the second crown 23 is arranged, also movable axially against the action of second elastic means 24. The elastic means 22 and 24 keep the respective crowns 21 and 23 in an inactive position, normally closed. On the outer cylindrical surface of the male body 14 a circumferential sealing element 50 is assembled, which cooperates in static manner with the inner cylindrical surface of the male body 14.

On the outer cylindrical surface of the second crown 23 a circumferential sealing element 45 is assembled, for example an O-ring, suitable to cooperate continuously, and in an axial direction, with the inner cylindrical surface of the first external body 13 in order to guarantee a continuous seal. Thus, in element A the circumferential sealing elements 49 and 51 intervene to make a seal on mating cylindrical surfaces only when element A is disconnected from element B.

The circumferential sealing elements 44 and 45 on the contrary are always operative, through axial sliding, on cylindrical surfaces and always exert a sealing function.

In a substantially corresponding manner, the second external male body 14 defines an open seating 25 to house and retain the segment 11b of the tube 11, the seating 25 being delimited at the front by a flange-type ring 26 which, in this case, consists of the external end of a hollow and elongated positioning body 27. The flange-type ring 26 includes peripheral holes 28 for the transit of the fluid and a central hole 30 to position a connector 29, the external end of which emerges from the second external body 14 in order to receive and retain the segment 12b of the capillary 12.

According to a variant, the connector 29 can be in a single piece with the positioning body 27.

The positioning body 27 houses inside itself a piston 31, movable axially against the action of third elastic means 32, while on the outside of it a movable ring 33 is positioned, able to slide axially against the action of fourth elastic means 34.

The positioning body 27 has on its outside a first 46 and a second 47 circumferential sealing element, for example of the O-ring type. The first circumferential sealing element 46 cooperates through sliding with the inner cylindrical surface of the positioning body 19 when element B is coupled with element A.

The second circumferential sealing element 47 is always in a sealed condition, sliding on the inner cylindrical surface of the movable ring 33. The movable ring 33 has on its outside a circumferential sealing element 52 which seals on the inner cylindrical surface 54 when the elements A and B are not coupled.

The piston 31 has on its outside a circumferential sealing element 48 which, when the elements A and B are not coupled, cooperates in sealed manner with the circular surface 56 present inside the positioning body 27.

Another circumferential sealing element 53, in the case of the geometrical solution shown as an example here, is assembled on the outside of the connector 29.

An annular tooth 57 functions as a positioning abutment for the second movable crown 23 when the elements A and B are not coupled. An annular tooth 58 functions as a positioning abutment for the movable ring 33 when the elements A and B are not coupled. An annular tooth 59 functions as a positioning abutment for the movable piston 31 when the elements A and B are not coupled.

Moreover, in the embodiment shown here, on the wall of the female body 13 a ball-type abutment element 40 is inserted, associated with elastic means 41; when the male body 14 is taken to the position of maximum insertion in the female body 13, the ball-type element 40 is thrust into a mating cavity 42 made on the outer wall of the male body 14 so as to define an end-of-travel position.

The joint-type coaxial connection 10 as described heretofore functions as follows.

In the inactive condition, that is, with the elements A and B not coupled, shown in FIG. 1, the two parts, male and female, of the connection 10 are only reciprocally attached, but the elastic means 22, 24, 32 and 34 keep the respective movable means 21, 23, 31 and 33 in the closed position, so that there is no passage of fluid between the respective segments of the tube 11 and the capillary 12.

This condition is maintained also when the male and female parts of the connection 10 are detached from each other. In this condition, where there is no passage of fluids between inlet and outlet of the joint-type connection 10, a perfect hydraulic seal of the respective parts is guaranteed, for element A by the circumferential sealing elements 45, 51, 49 and 44, and for element B by the circumferential sealing elements 46, 47, 48, 52 and 53.

All the circumferential sealing elements operate through axial sliding.

If, for example, we want to make the two pairs of pipes 11a, 11b, 12a, 12b communicate, the male body 14 is made to advance towards the left until it substantially reaches the end-of-travel position wherein the ball-type abutment element 40 is thrust elastically into the cavity 42.

Such advance of the male body 14 with respect to the female body 13 causes the following movements:
  the movable crown 23 is made to retreat (towards the left) by the thrust exerted thereon by the end of the male body, against the action of the elastic means 24; this movement is facilitated by the presence of the circumferential sealing element 45 that slides on the inner wall of the body 13;
  the movable crown 21 is made to retreat (towards the left) by the thrust exerted thereon by the end of the positioning body 27, which moves solidly with the male body 14, against the action of the elastic means 22; this movement is facilitated by the presence of the circumferential sealing element 44 that slides on the inner wall of the positioning body 19;
  the movable piston 31 and the movable ring 33 remain stationary with respect to the movement of the male body 14, compressing the associated elastic elements 32 and 34, since they are in abutment against, respectively, the fixed piston 20 and the positioning body 19; in this sense the adjective movable does not in fact mean a movement, but the maintenance of a stationary position while the elements around them are displaced towards the left.

Figure 4:
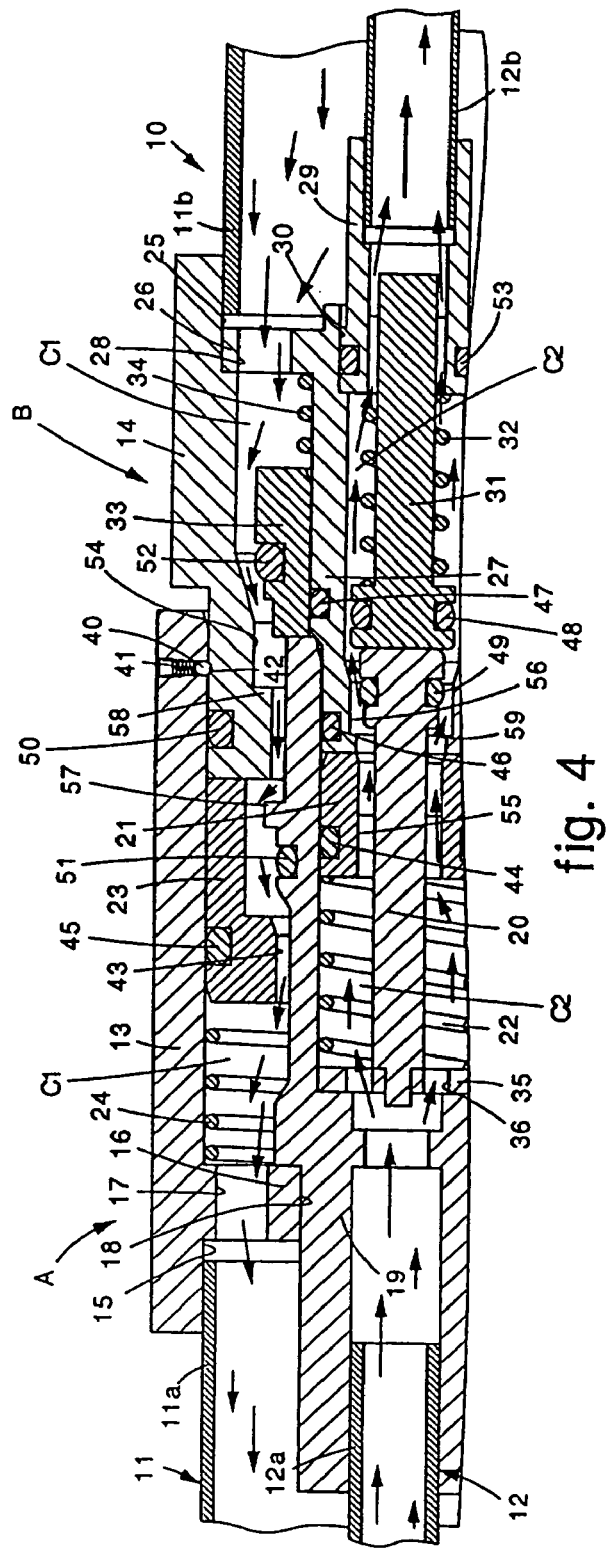
FIG. 4 shows on an enlarged scale the upper half of the connection in FIG. 2, indicating the coaxial transit paths of the two fluids.

This movement of the male body 14 towards the left with respect to the female body 13 thus determines the opening of respective transit paths, as indicated by C1 and C2 in FIG. 4, which put the two pairs of pipes 11a, 11b and 12a, 12b in communication.

Even a very short movement of the male body 14 allows the transit paths C1 and C2 to be opened, thanks to the fact that the front end of the female body 13 is positioned substantially aligned with the end of the positioning body 19, and with the front end of the fixed piston 20.

To be more exact, the gas flowing, for example, in a direction from left to right from the segment 12a to the segment 12b, passes in the axial cavity of the positioning body 19, in the holes 36 of the washer 35, between the spirals of the elastic means 22, around the fixed piston 20 and in the annular gap between the latter and the movable crown 21, it crosses through the axial cavity of the positioning body 27, between the spirals of the elastic means 32, in the annular channels 39 provided between the movable piston 31 and the connector 29 and from here reaches the second segment 12a of the capillary 12.

The path of the liquid, considering the direction from right to left from the segment 11b to the segment 11a, is as follows.

The liquid passes into the peripheral holes 28 of the outer end of the positioning body 27, between the spirals of the elastic means 34, on the outside of the movable ring 33, around the outer wall of the latter, in the annular channels 43 between the movable crown 23 and the positioning body 19, between the spirals of the elastic means 24, in the peripheral holes 17 of the flange-type ring 16, and from here reaches the segment 11a of the tube 11.

FIG. 5 shows a variant wherein components that are the same or that have a function equivalent to those described with reference to FIGS. 1–4 have the same reference number.

In this embodiment, the positioning bodies, indicated by 19 and 27 in FIGS. 1 and 4, are divided into two parts, respectively indicated by 119a and 119b and 127a and 127b.

On the piston 31 a toroidal packing 148 is assembled which, when the connection 10 is in the closed condition, cooperates through axial sliding with the inner cylindrical wall of the element 127a of the positioning body so as to ensure the correct seal of the relative pipe C2. The packing 148 has an equivalent function to that of the packing 48 in the embodiment shown in FIG. 4.

The element 119b of the positioning body has a toroidal packing 151 on the outside which, when the connection 10 is in the closed condition, cooperates through axial sliding with the inner cylindrical wall of the second movable crown 23 so as to ensure the correct seal of the relative pipe C1; the packing 151 has an equivalent function to that of the packing 51 in the embodiment shown in FIG. 4.

FIG. 5 also shows a threaded ring-nut 60 which is screwed onto the outside of the two bodies, female 13 and male 14, in order to connect them to each other and make possible the communication between the respective segments of the pipes C1 and C2 through which the fluid passes.

With reference to FIG. 6, an applicative variant is shown wherein the connection, or joint, 10 also performs the function of a heat exchanger in a cooling plant.

According to this variant, the cold fluid arriving from a condenser 62 is made to pass through the connection or joint 10.

Similarly, the hot fluid exiting from an evaporator 63 is made to pass through the joint 10.

The compressor 61 receives the fluid from the joint 10 and sends it to the condenser 62, while the fluid arriving from the condenser 62 passes through the capillary 12 or through an expansion valve having the same functions.

Modifications and/or additions of parts can be made to the joint-type coaxial connection, or joint, 10 as described heretofore, without departing from the field and scope of the present invention.

For example, it comes within the field of the invention that the selective drive of the male body 14 with respect to the female body 13 can be automated and even commanded from a distance, by means of electric, hydraulic, pneumatic or mechanical commands. It also comes within the field of the invention that the external bodies 13 and 14 are both of the female type and house inside themselves piston elements or suchlike able to be driven in order to open/close the coaxial connection. The elastic means shown here are of the helical spring type, but it comes within the field of the invention that any elastic means can be used, provided that they are able to perform the same or equivalent function.

The packings too can be of any type, number and arrangement, provided that they are able to perform the circumferential sealing function, through axial sliding, in every reciprocal position of the components of the connection.

It is within the spirit of the invention to provide the application in cooling and/or conditioning plants both for civil and industrial premises, and also for electric panels, command panels and cabins, etc.

The invention claimed is:

1. Joint-type coaxial connection to connect/disconnect to/from each other two elements (A, B) defining respective coaxial tubular pipes inside which a respective fluid flows, said connection defining, when said elements (A, B) are connected to each other, two respective coaxial and substantially rectilinear paths for the passage of a respective fluid, said two coaxial rectilinear paths being able to be selectively opened/closed substantially simultaneously, one path (C2) being internal and the other (C1) being external, so as to connect pairs (11a, 11b; 12a, 12b) of tubular pipes, respectively an outer pipe and an inner pipe, each pair (11a, 11b; 12a, 12b) being present in a respective element (A, B) and including respective interception means in the disconnected condition, characterized in that the first element (A) has elastically contrasted connection/disconnection means consisting of at least a first toric crown (23) comprising at least a relative circumferential sealing element (45) and a second toric crown (21) comprising at least a relative circumferential sealing element (44);

the second element (B) has respective thrust means cooperating with a relative elastically contrasted means (23, 21) present in element (A), said thrust means comprising a male toric body (14) including at least a relative circumferential sealing element (50) and toric positioning body (27) including at least a respective circumferential sealing element (47), wherein, in the passage of connection/disconnection of said elements (A, B), when said toric thrust means (14, 27) are acting in thrust/release on the relative elastically contrasted toric crowns (23, 21), said circumferential sealing elements (44, 47, 45, 50) are always operative so as to separate in a sealed manner, so that said respective fluids do not mix with each other, the inner pipes (12a, 12b) from the outer pipes (11a, 11b) and the outer pipes (11a, 11b) from the part of the joint-type connection that is outside said outer pipe.

2. Connection as in claim 1, characterized in that said circumferential sealing elements (45, 44) are arranged on the outside of the relative toric crowns (23, 21).

3. Connection as in claim 1, characterized in that said circumferential sealing elements (14, 27) are arranged on the outside of the relative toric thrust means (50, 47).

4. Connection as in claim 1, characterized in that said second element (B) includes elastically contrasted movable means (33, 31) cooperating, at least in the passage of connection/disconnection, with mating thrust means (20, 19) present in said first element (A).

5. Connection as in claim 4, characterized in that said thrust means of said first element (A) comprise an axial piston (20) and a toric positioning body (19) including respective circumferential sealing elements (49, 50) and in that said elastically contrasted movable means of said second element (B) comprise an axial piston (31) and a movable ring (33) including respective circumferential sealing elements (48, 52), wherein said circumferential sealing elements (49, 51, 48, 52), at a point of the connection/disconnection travel, are able to respectively open or close the fluid connection between the respective inner pipes (12a, 12b) and create the inner path (C2) for the transit of the fluid, and between the respective outer pipes (11a, 11b) to create the outer path (C1) for the transit of the fluid.

6. Connection as in claim 5, characterized in that said circumferential sealing elements (49, 51) are arranged on the outside of the relative thrust means (20, 19).

7. Connection as in claim 5, characterized in that said circumferential sealing elements (48, 52) are arranged on the outside of the relative elastically contrasted movable means (31, 33).

8. Connection as in claim 1, characterized in that the circumferential sealing elements (44, 45, 46, 48, 49, 50, 51, 52) are able to cooperate through axial sliding with the circumferential walls of the coordinated movable elements/positioning bodies.

9. Connection as in claim 1, characterized in that the cooling fluid inside one pair (11a, 11b) of pipes flows in the same direction with respect to the fluid in the other pair (12a, 12b).

10. Connection as in claim 1, characterized in that the cooling fluid inside one pair (11a, 11b) of pipes flows in the opposite direction with respect to the fluid in the other pair (12a, 12b).

11. Connection as in claim 1, characterized in that, when the elements (A, B) are disconnected, elastic means (22, 24, 32, 34) are able to keep the relative movable elements (21, 23, 31, 33) elastically contrasted in an inactive position wherein said paths (C1, C2) for the transit of fluid are closed.

12. Connection as in claim 1, characterized in that said movable elements (21, 23, 31, 33) are able to be moved against the action of the respective elastic means during the action of reciprocal axial movement of the two external bodies (13, 14) of the respective elements (A, B).

13. Connection as in claim 12, characterized in that the external bodies (13, 14) are associated with clamping means (40, 42, 60) in the open position when the fluid is passing.

14. Connection as in claim 1, characterized in that the elements (A, B) are associated with remote control and drive means.

15. Connection as in any claim 1, characterized in that it performs the function of a heat exchanger between one and the other fluids passing through.

16. Connection as in claim 1, characterized in that in a cooling circuit it is put in cooperation with a delivery pipe to a compressor (61) and with a delivery pipe to a capillary (12) or to an expansion valve.

* * * * *